(12) United States Patent
Baker et al.

(10) Patent No.: US 9,802,493 B2
(45) Date of Patent: Oct. 31, 2017

(54) MULTI-PHASE BIDIRECTIONAL DC TO DC POWER CONVERTER CIRCUITS, SYSTEMS AND METHODS WITH TRANSIENT STRESS CONTROL

(71) Applicant: COOPER TECHNOLOGIES COMPANY, Houston, TX (US)

(72) Inventors: Gary Bruce Baker, Sherwood, OR (US); Nicholas Taylor Begley, Portland, OR (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 319 days.

(21) Appl. No.: 14/739,438

(22) Filed: Jun. 15, 2015

(65) Prior Publication Data

US 2015/0367735 A1 Dec. 24, 2015

Related U.S. Application Data

(60) Provisional application No. 62/014,895, filed on Jun. 20, 2014.

(51) Int. Cl.
*B60L 11/02* (2006.01)
*B60L 11/18* (2006.01)
*H02M 3/158* (2006.01)

(52) U.S. Cl.
CPC ............... *B60L 11/02* (2013.01); *B60L 11/18* (2013.01); *H02M 3/1582* (2013.01); *H02M 3/1584* (2013.01); *H02M 2003/1586* (2013.01)

(58) Field of Classification Search
None
See application file for complete search history.

(56) References Cited

U.S. PATENT DOCUMENTS

| 5,734,258 A | 3/1998 | Esser |
| 7,554,310 B2 | 6/2009 | Chapuis et al. |
| (Continued) | | |

FOREIGN PATENT DOCUMENTS

| JP | 2006311729 A | 11/2006 |
| JP | 2007159315 A | 6/2007 |
| (Continued) | | |

OTHER PUBLICATIONS

International Search Report and Written Opinion of International Application No. PCT/US2015/036393, dated Aug. 27, 2015, 10 pages.
(Continued)

*Primary Examiner* — Jared Fureman
*Assistant Examiner* — Joel Barnett
(74) *Attorney, Agent, or Firm* — Armstrong Teasdale LLP

(57) ABSTRACT

A circuit, system, and method for a multi-phase bidirectional DC/DC power converter includes a plurality of single phase DC/DC power converter circuits coupled in electrical parallel. A converter controller includes a compensator and a saturation limit function module. The compensator is configured to generate a control signal based on a current command signal and an actual current signal. The saturation limit function module is configured to determine a saturation limit for the compensator while the compensator is in a disabled state. The converter controller is configured to disable one or more of the plurality of power converter circuits, match the saturation limit values of the compensator to current operating values when one or more of the plurality of single phase DC/DC power converter circuits is disabled, and re-enable the one or more of the plurality of power converter circuits using the matched saturation limit values to limit transient current stress as any disabled phases and compensators are re-enabled.

20 Claims, 5 Drawing Sheets

(56) References Cited

U.S. PATENT DOCUMENTS

| | | | |
|---|---|---|---|
| 8,629,663 B2 | 1/2014 | Latham, II et al. | |
| 9,684,320 B2 * | 6/2017 | Shin | G05F 1/46 |
| 2005/0254272 A1 | 11/2005 | Vinciarelli | |
| 2008/0137379 A1 | 6/2008 | Mao | |
| 2013/0003423 A1 * | 1/2013 | Song | H02M 3/33584 363/21.02 |
| 2013/0082670 A1 | 4/2013 | Houston | |
| 2015/0146455 A1 * | 5/2015 | Engel | H02M 3/33584 363/17 |
| 2015/0364982 A1 * | 12/2015 | Chae | H02M 3/157 307/52 |

FOREIGN PATENT DOCUMENTS

| | | |
|---|---|---|
| JP | 2012154793 A | 8/2012 |
| JP | 201418019 A | 1/2014 |
| KR | 1020120072561 A | 7/2012 |
| WO | 2004072589 A2 | 8/2004 |

OTHER PUBLICATIONS

Kim, K. et al., Mode Change Method of Bi-Directional DC/DC Converter for Electric Vehicle, 8th International Conference on Power Electrics—ECCE Asia, May 30-Jun. 3, 2011, IEEE, 2011, pp. 2687-2693.

Angkititrakul, S. et al., Active Conductor Current Balancing for Interleaving Multi-Phase Buck-Boost Converter, IEEE, 2009, pp. 527-532.

* cited by examiner

MULTI-PHASE BIDIRECTIONAL DC TO DC POWER CONVERTER CIRCUITS, SYSTEMS AND METHODS WITH TRANSIENT STRESS CONTROL

CROSS REFERENCE TO RELATED APPLICATIONS

This application claims the benefit of U.S. Provisional Application Ser. No. 62/014,895 filed Jun. 20, 2014, the complete disclosure of which is hereby incorporated by reference in its entirety.

BACKGROUND

The field of the invention relates generally to DC to DC power converters, and more specifically to DC to DC power converters for use in electrical power systems, for example, in the power systems of vehicles.

At least some known DC to DC (DC/DC) power converters are configured to bridge two energy systems of differing voltage and transfer power from one system to the other. An example may be to bridge a 24 volt system and a 48 volt system in a piece of construction equipment or in a vehicle. Transferring energy between the two systems facilitates promoting energy and cost efficiency. Certain types of DC to DC power converters are problematic in some aspects, however, and improvements are desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION

DC/DC power converters can be configured to be bidirectional to provide power from, for example, and as mentioned previously, a 24 volt system and 48 volt system and also to provide power from the 48 volt system to the 24 volt system. DC/DC power converters can be configured with a plurality of phases or converter circuits. The plurality of phases can be connected in electrical parallel and typically share current equally. During periods of relatively low load, each phase will be carrying an amount of current in a range that is not optimally efficient for the phases. To promote efficiency, it may be advantageous to turn off or disable one or more phases such that each operating phase carries an amount of current that is in the range of optimum efficiency for the phases and the total current for all the power converter is the same. However, after a period of being disabled, when enabling the disabled phases, the bidirectional multiphase DC/DC power converter phase may be subject to high transient current stress if the compensator (also known as error amplifier or integrator) is not initialized to a state that minimizes transient current in the averaging inductor of that converter (or phase).

In the case of a unidirectional power converter, this problem has been solved through the use of a "soft start" technique where the compensator is initialized to zero and allowed to ramp to its steady state operating point over a fixed ramp period. The technique does not work in the case of a bidirectional DC/DC converter as a "zero" initial state of the compensator may cause a large transient current in the reverse direction. Exemplary embodiments of bidirectional DC/DC power converters are described below that address such problems and limit transient current issues in operation.

Figure 1:
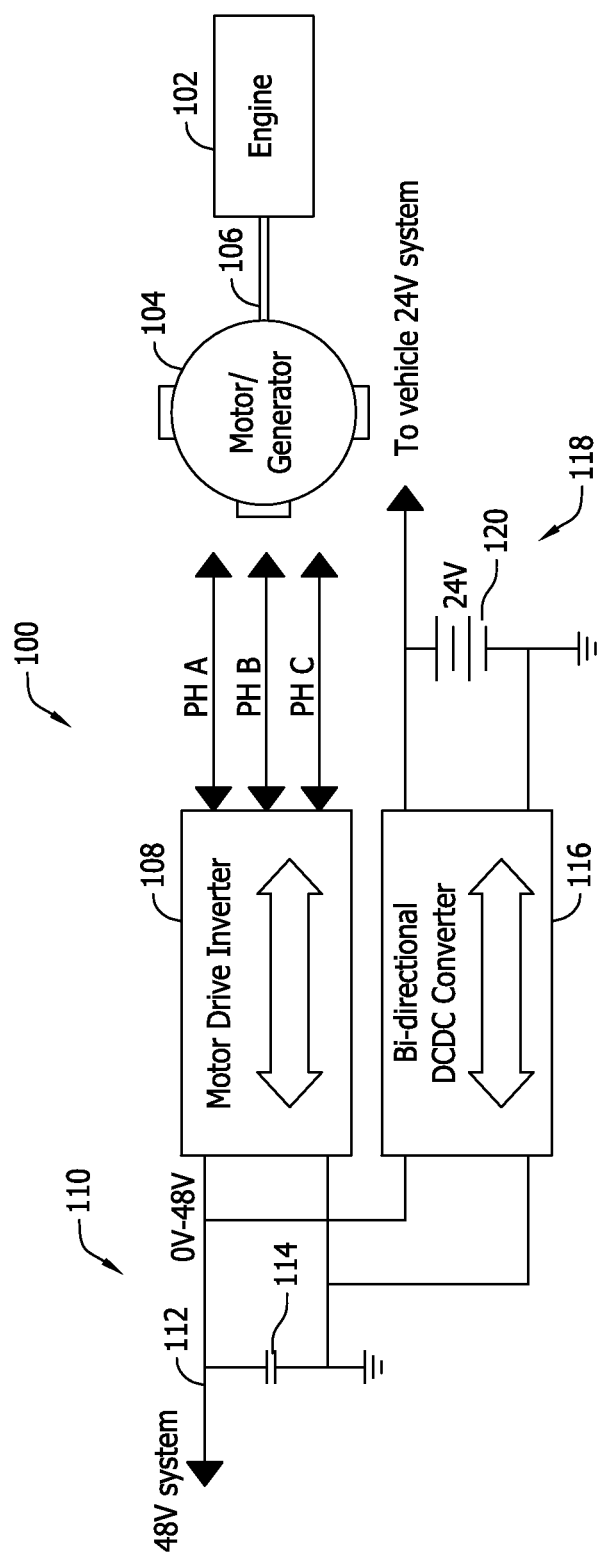
FIG. 1 is a schematic block diagram of an energy distribution system.

FIG. 1 is a schematic block diagram of an exemplary energy distribution system 100. In the example embodiment, energy distribution system 100 is configured to supply energy needs of a vehicle (not shown). In various embodiments, energy distribution system 100 is configured to supply energy needs of remote installations, plants, marine placements, and other energy users. Energy distribution system 100 includes an engine 102 coupled to an electric motor/generator 104 through, for example, a shaft 106. Electric motor/generator 104 is configured to supply electric energy to a motor drive inverter 108 or to receive electric energy from motor drive inverter 108. Motor drive inverter 108 converts the electric energy received from electric motor/generator 104 to, for example, but, not limited to, 48.0 volts to supply a 48.0 volt direct current (DC) electrical system 110 including a 48.0 volt direct current (DC) electric bus 112 and a voltage source, 114 such as, but, not limited to a battery or supercapacitor. Although described as a 48.0 volt system, electrical system 110 can be any voltage system, as needed.

Energy distribution system 100 also includes a multiphase bidirectional DC/DC power converter system 116 configured to supply another DC electrical system 118, such as, but, not limited to a 24.0 volt DC electric system configured to supply auxiliary loads and systems of the vehicle. DC electrical system 118 includes a voltage source, 120 such as, but, not limited to a battery or supercapacitor.

In the example embodiment, an application of multiphase bidirectional DC/DC power converter system 100 is to bridge two energy storage systems of different voltages. An example would be to bridge a 48V system and a 24V system in a piece of electrified construction equipment.

Figure 2:
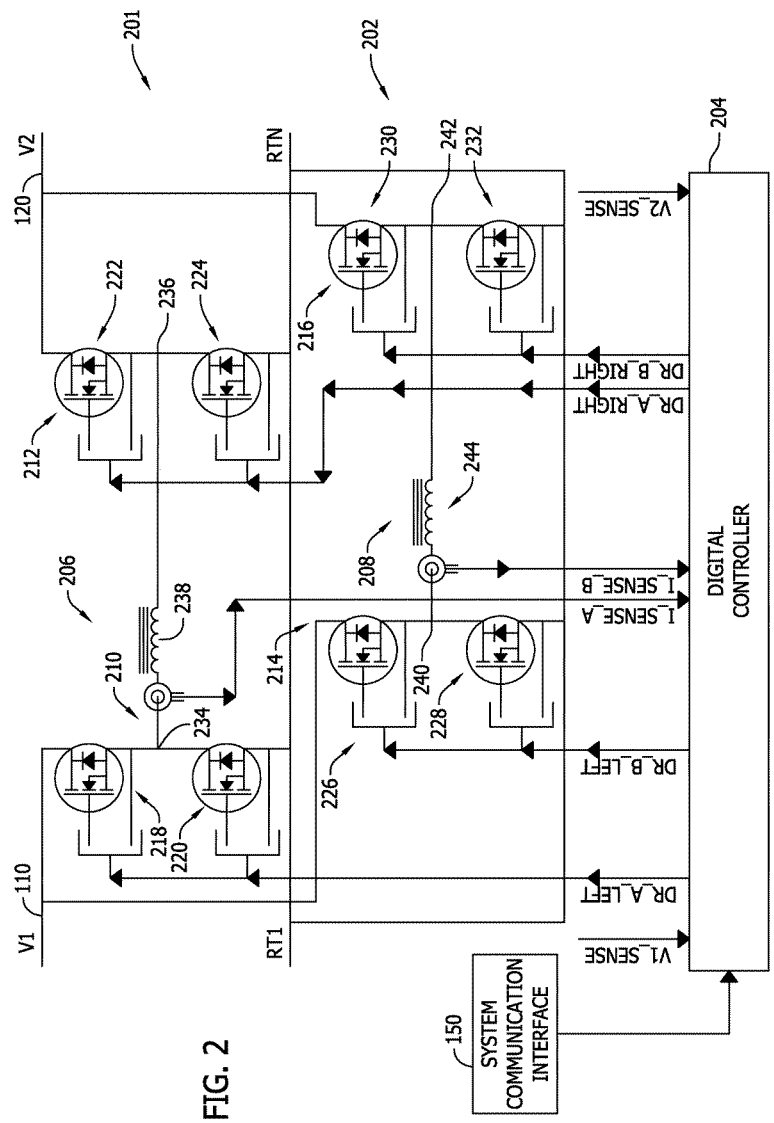
FIG. 2 is a schematic diagram of the multiphase bidirectional DC/DC power converter system shown in FIG. 1 in accordance with an example embodiment of the present disclosure.

FIG. 2 is a schematic diagram of an exemplary multiphase bidirectional DC/DC power converter system 116 for the exemplary energy distribution system 100 (FIG. 1) in accordance with an example embodiment of the present disclosure. In the example embodiment, power converter system 116 includes a first phase 201, a second phase 202, and a digital converter controller 204 communicatively coupled to each of DC/DC converter circuits 201 and 202. In various embodiments, power converter system 116 can include other numbers of phases, for example, three phases or four phases. Each phase of multiphase bidirectional DC/DC power converter system 116 is independently controlled such that the inductor currents may be equal in all operating phases. Each of DC/DC converter circuits 201 and 202 includes an H-configuration power switching section 206 and 208. Each of H-configuration power switching sections 206 and 208 include two switching legs 210, 212 and 214, 216, respectively. Each switching leg 210, 212, 214, and 216 includes two switches coupled in electrical series. Switching leg 210 includes switches 218 and 220, switching leg 212 includes switches 222 and 224, switching leg 214 includes switches 226 and 228, and switching leg 216 includes switches 230 and 232. Switching legs 210 and 212 are interconnected at respective midpoint nodes 234 and 236 by a switching inductor 238. Switching legs 214 and 216 are interconnected at respective midpoint nodes 240 and 242 by a switching inductor 244. In various embodiments, switches 218, 220, 222, 224, 226, 228, 230, and 232 are embodied in, for example, semiconductor devices, such as, but, not limited to Metal Oxide Semiconductor Field Effect Transistors (MOSFETs) or insulated-gate bipolar transistors (IGBTs). In other embodiments, other types of electronic switches are used.

DC/DC power converter system 116 is digitally controlled by digital converter controller 204 and is configured to transfer power between a first voltage source (V1) 110 and a second voltage source (V2) 120. The terminal voltages of first voltage source (V1) 110 and a second voltage source (V2) 120 can dynamically vary so that first voltage source (V1) 110 can be greater than or equal to second voltage source (V2) 120 or first voltage source (V1) 110 can be less than or equal to second voltage source (V2) 120. The power transfer between the two voltage sources takes place under constant current or under constant power independently of the voltaic relationship between first voltage source (V1) 110 and second voltage source (V2) 120. In embodiments with other than two phases, additional phases are added by coupling additional H-configuration power switching sections between first voltage source (V1) 110 and second voltage source (V2) 120. Typically, the phases are operated out-of-phase by $2\pi/n$ degrees, where n is the number of phases. A two phase system is operated with the phases operating 180° out-of-phase, a three phase system is operated with the phases operating 120° out-of-phase, and so on. The use of multiple phases in DC/DC converter 116 results in cancellation of ripple currents on the input and output ports of DC/DC converter 116 and lower ripple current stress on internal filtering components.

In one embodiment, switching inductors 238 and 244 are primarily responsible for the power conversion process, as switching inductors 238 and 244 store energy in a first part of the operating cycle and release the stored energy in a second part of the operating cycle, while ensuring that the energy transfer takes place in the desired direction, regardless of the voltaic relationship between first voltage source (V1) 110 and second voltage source (V2) 120.

A constant average current, equal to the desired average current, is impressed through switching inductors 238 and 244. The control of the constant average current is generally performed under closed loop operation. The output of the current loop controls the voltage across switching inductors 238 and 244 by switching the state of switches 218, 220, 222, 224, 226, 228, 230, and 232 ('ON' or 'OFF'). Multiphase bidirectional DC/DC power converter system 116 is configured to operate in a plurality of modes including at least a buck mode and a boost mode wherein a "buck" mode is defined by first voltage source (V1) 110 being greater than second voltage source (V2) 120 and a "boost" mode is defined by first voltage source (V1) 110 being less than second voltage source (V2) 120 irrespective of current direction. When operating in boost mode, switch 220 is 'OFF', switch 218 is 'ON' and switches 222, 224 operate complimentarily. When operating in the buck mode, switch 224 is OFF, switch 222 is ON, and switches 218 and 220 operate complementarily, cycling ON and OFF to achieve the power transfer. The rate of this switching may be referred to as the "switching frequency". The inverse, or reciprocal, of the switching frequency may be referred to as the "switching period" or "switching cycle". Switches 218, 220, 222, 224, 226, 228, 230, and 232, may be in the 'ON' state for a particular duration (i.e., an "on-period") within the switching period. The ratio of the 'ON' time of a particular switch divided by the switching period is referred to as the "duty ratio" or "duty cycle."

In one embodiment, a control algorithm (described below) generates, and corrects, duty cycles of switches 218, 220, 222, 224, 226, 228, 230, and 232 using software executed in, for example, digital converter controller 204. Control parameters within digital converter controller 204 are configurable to adjust the performance of multiphase bidirectional DC/DC power converter system 116.

Digital converter controller 204 receives power/current and voltage commands from a system communication interface 150 communicatively coupled to, for example, but, not limited to, a vehicle controller (not shown). A control algorithm within digital converter controller 204 generates duty cycles of switches 218, 220, 222, 224, 226, 228, 230, and 232. Digital converter controller 204 also performs feedback measurements that are compared to the power and voltage commands. The duty cycles of drive signals sent by digital converter controller 204 are adjusted so that the feedback values of digital converter controller 204 substantially match the power and voltage commands.

Digital converter controller 204 is configured to implement "phase dropping" at low power levels to achieve optimum power conversion efficiency across the operating power range. Phase dropping is implemented to disable individual phases at low power levels based upon an empirically calculated optimum efficiency threshold for each individual phase or a function of total demanded current from the converter.

Figure 3:
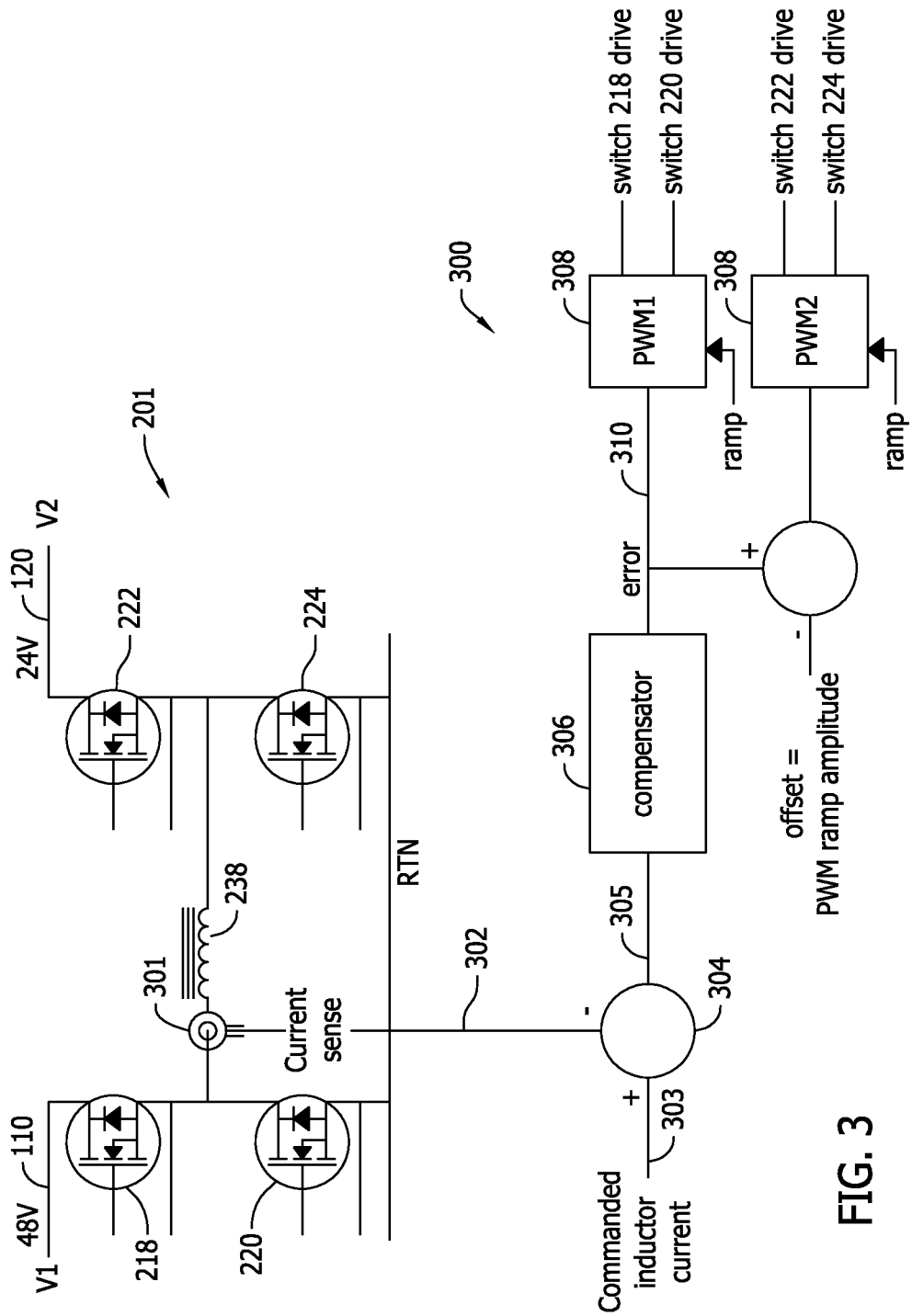
FIG. 3 is a schematic diagram of the first phase shown in FIG. 2 of the multiphase bidirectional DC/DC power converter system shown in FIG. 1 illustrating a control loop for controlling average current in each phase of the multi-phase converter system.

FIG. 3 is a schematic diagram of first phase 201 (shown in FIG. 2) of multiphase bidirectional DC/DC power converter system 116 (shown in FIG. 1) illustrating a control loop 300 for controlling average current in each phase of multi-phase converter system 116. In various embodiments, control loop 300 is embodied in converter controller 204. An electrical current through switching inductor 238 is sensed by a current sensor 301 and a current signal 302 representative of the inductor current is summed with an inductor current command 303 in a summation block 304. In the example embodiment, inductor current command 303 is the same for all phases. In various embodiments, inductor current command 303 may be different for any of the phases, depending on the particular application. An output 305 of summation block 304 is directed to a compensator 306. Each phase includes at least one compensator 306 and a plurality of pulse width modulators 308 (PWMs) driving respective switches 218, 220, 222, and 224.

Control loop 300 controls the average current in switching inductor 238 by varying the duty cycle of the driven switches 218, 220, 222, and 224 based on an output error signal 310 of compensator 306. In operation, saturation limits of compensator 306 are set to limits of the desired operating range of the duty cycle and are fixed while in operation as is described below.

When phase 201 is disabled, voltages of first voltage source (V1) 110 and second voltage source (V2) 120 still exist on the input/output ports of converter 116. Such a situation occurs when one or more phases of multiphase converter 116 are disabled to increase an efficiency of converter 116 at light loads. In the disabled state, if compensator 306 saturation limits remain fixed, compensator 306 (because of high DC gain) will reach one of the saturation limits and remain there (often called "integrator windup" in the digital control domain). When phase 201 is re-enabled, compensator 306 output is not "near" its steady state operating point and will cause a large average voltage across the inductor resulting in a large transient current while compensator 306 output moves to its steady state value.

Figure 4:
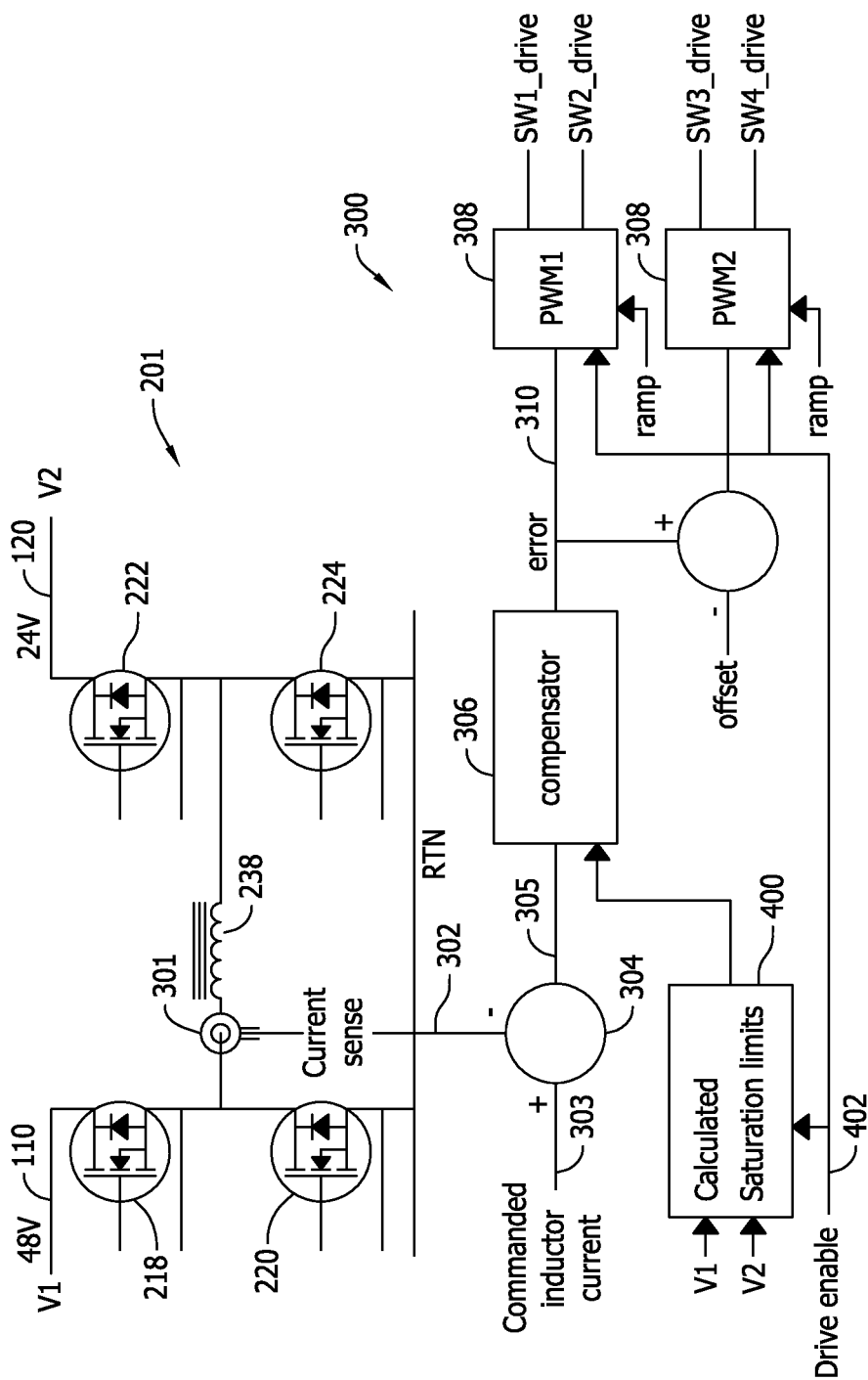
FIG. 4 is a schematic diagram of the first phase shown in FIG. 2 of the multiphase bidirectional DC/DC power converter system shown in FIG. 1 illustrating a calculated saturation limit function module.

FIG. 4 is a schematic diagram of first phase 201 of multiphase bidirectional DC/DC power converter system 116 illustrating a calculated saturation limit function module 400. In the example embodiment, calculated saturation limit function module 400 is configured to determine an upper saturation limit and a lower saturation limit for compensator 306 while compensator 306 is in the disabled state. A drive enable signal 402 is used to control the state of first phase 201. When first phase 201 is disabled, PWMs 308 are turned off and calculated saturation limit function module 400 is enabled. The upper saturation limit and lower saturation limit are set to the same value and determined by a function of as a function of first voltage source (V1) 110 and a second voltage source (V2) 120 and a topology of first phase 201 of multiphase bidirectional DC/DC power converter system 116. This forces the compensator output to be equal to the steady state operating value the given first voltage source (V1) 110 and second voltage source (V2) 120 values. The saturation limit values are determined as follows for the circuit topology shown in FIG. 4. The calculation assumes a PWM range of 0-1 covering buck mode (0-0.5) and boost mode (0.5 to 1) using a PWM Ramp amplitude of 0.5.

$$\text{SatLim}(V1,V2)=V2/(2*V1) \text{ when } V2<V1 \quad (1)$$

$$\text{SatLim}(V1,V2)=((V2-V1)/(2*V2))+0.5 \text{ when } V2>V1 \quad (2)$$

A PWM Ramp amplitude of 0.5. and compensator range of 0-1 is assumed in this example.

The upper and lower saturation limit values are calculated and updated on a regular basis while first phase 201 is in the disabled state. Equations 1 and 2 can be modified to accommodate other circuit topologies.

Figure 5:
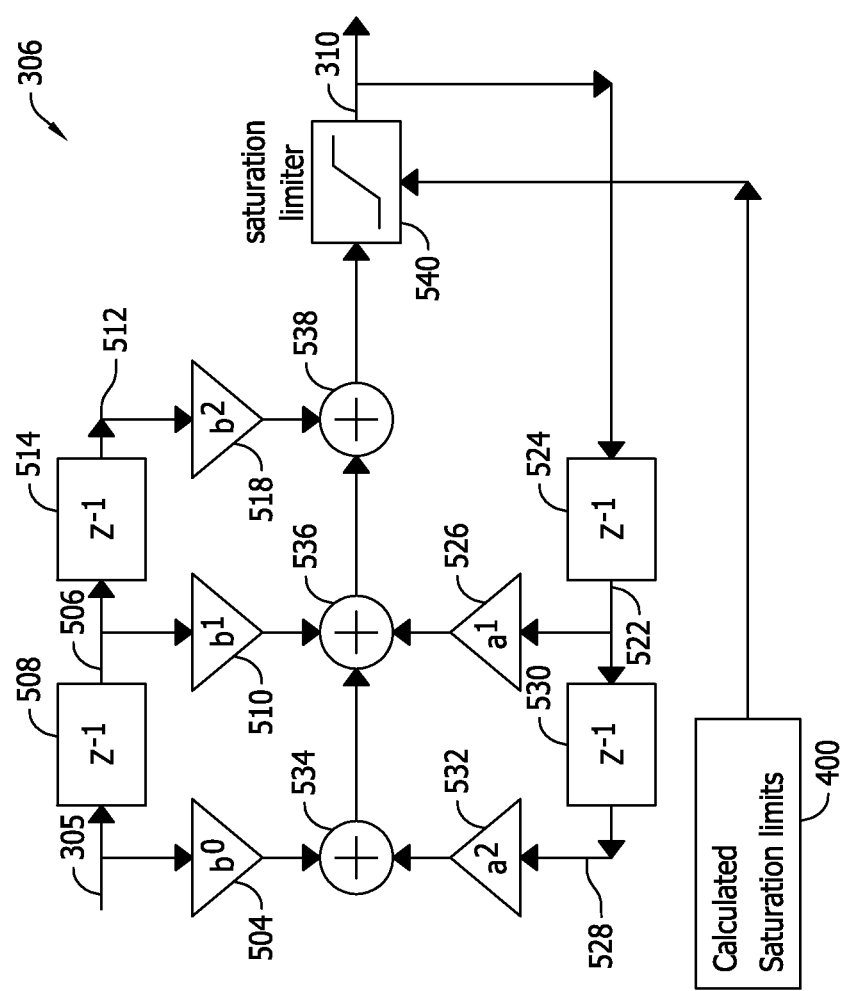
FIG. 5 is a control signal diagram of the compensator shown in FIG. 3 implemented, in one embodiment, by a 2-pole/2-zero Infinite Impulse Response (IIR) filter with a saturation limiter.

FIG. 5 is a control signal diagram of compensator 306 implemented in one embodiment by a 2 pole/2 zero Infinite Impulse Response (IIR) filter with a saturation limiter.

Output 305 of summation block 304 (shown in FIG. 3) is input to compensator 306 and is multiplied by a coefficient $b_0$ at multiplier 504. In parallel with the previous operation, an input signal that has been delayed one time unit 506, by unit delay 508 is multiplied by a coefficient $b_1$, at multiplier 510. In parallel with the previous operations, an input signal that has been delayed two time units 512 by unit delays 508 and 514 is multiplied by a coefficient $b_2$ at multiplier 518.

An output signal 310 of compensator 306 (shown in FIGS. 3 and 4) that has been delayed one time unit 522 by delay unit 524 is multiplied by a coefficient $a_1$ at a multiplier 526. In parallel with the previous operation, an input signal that has been delayed two time units 528 by unit delays 524 and 530 is multiplied by the coefficient $a_2$ at multiplier 532.

The product of multiplier 504 is then added to the product of multiplier 532 at addition element 534. The result from addition element 534 is then added to the product of multiplier 510 and to the product of multiplier 526 at addition element 536. The result from addition element 536 is then added to the product of multiplier 518 at addition element 538. The result from addition element 538 is applied to a saturation limiter 540. Saturation limiter 540 is configured to implement equations 1 and 2 to dynamically vary compensator initialization values based upon operating conditions, such as a current value of first voltage source (V1) 110 and second voltage source (V2) 120 values, which will limit and control transient current stress during re-enablement of any disabled phases and compensator 306.

It is contemplated that the power converter 116 may be used in any application. In vehicular applications, the voltages bridged by the multiphase bidirectional DC/DC power converter system may be, for example 48 volts or 24 volts nominal DC. It is contemplated that the vehicle may be any self-propelled vehicle. For example, the vehicle may be a truck, automobile, bus, recreational vehicle, boat, ship, airplane, helicopter, all-terrain vehicle, motorcycle, or golf cart. The vehicle may also be a specialty vehicle such as a skid steer, forklift, mining vehicle, off highway dump truck, swing shovel, dragline, or locomotive. The power converter may power ABS brakes, an air compressor, or any other device on the vehicle. The power converter may also be used in an application other than a vehicle.

It is contemplated that various devices and components of the multiphase bidirectional DC/DC power converter system 116 of FIGS. 1 and 2 may be implemented in various ways and considered part of different components or sections of the power converter than as described herein. For example, although the switches are shown as MOSFETs, other devices such as IGBTs may be used in its place. Further, the IIR filter implementation of compensator 306 may be replaced by, for example, a PI or PID compensator. All of these permutations are considered within the scope of the invention disclosed herein.

The benefits and advantages of the present invention are now believed to have been amply illustrated in relation to the exemplary embodiments disclosed.

An embodiment of a multi-phase bi-directional DC/DC power converter has been disclosed. In the embodiment, the power converter includes a first single phase DC/DC power converter circuit coupled between a first electrical bus operating at a first voltage level and a second electrical bus operating at a second voltage level. The first single phase DC/DC power converter is configured to receive electrical power from one of the first electrical bus and the second electrical bus and provide electrical power to the other of the first electrical bus and the second electrical bus. The power converter includes a second single phase DC/DC power converter circuit coupled in electrical parallel with the first single phase DC/DC power converter across the first electrical bus and the second electrical bus. A converter controller is configured to control an operation of the first single phase DC/DC power converter circuit and the second single phase DC/DC power converter circuit and disable one of the first and the second single phase DC/DC power converter circuits to increase an efficiency of the multi-phase bi-directional DC/DC power converter.

Optionally, the power converter includes more than two single phase DC/DC power converter circuits coupled in electrical parallel. Each of the single phase DC/DC power converter circuits may comprise an H-configuration power switching section wherein a first leg of the H-configuration power switching section is coupled between a first electrical bus operating at a first voltage level and a circuit return and a second leg of the H-configuration power switching section is coupled between a second electrical bus operating at a second voltage level and the circuit return.

The converter controller may be configured to control a switching of a plurality of switches between an off condition wherein the switch is an electrical open and an on condition wherein the switch is an electrical short. The plurality of switches may be coupled together in a respective H-configuration between the first electrical bus and the second electrical bus. Moreover, the converter controller may be configured to maintain the plurality of switches in an off condition when a respective one of the single phase DC/DC power converter circuits is disabled.

The respective H-configuration may include an inductor and a current through the inductor may be controlled by respective positions of the plurality of switches wherein the converter controller is configured to maintain approximately zero electrical current flow through the inductor when a respective one of the single phase DC/DC power converter circuits is disabled.

The converter controller may optionally include a plurality of pulse width modulators communicatively coupled to respective ones of the plurality of switches, wherein the pulse width modulators are configured to control respective positions of the plurality of switches and to maintain the plurality of switches in an off condition when a respective one of the single phase DC/DC power converter circuits is disabled. The converter controller may also be further configured to operate the first and second single phase DC/DC power converter circuits in a first buck mode when the first electrical bus voltage is greater than second electrical bus voltage and operate the first and second single phase DC/DC power converter circuits in a second boost mode when the first electrical bus voltage is less than second electrical bus voltage.

An embodiment of a method of supplying electrical power using a multi-phase bi-directional DC/DC power converter is also disclosed. The method includes coupling a plurality of H-configuration power converter phases together in electrical parallel, controlling current flowing through each power converter phase to be approximately equal to current flowing through each other power converter phase, disabling at least one of the plurality of H-configuration power converter phases and maintaining a remainder of the plurality of H-configuration power converter phases enabled, and controlling current flowing through the remainder of the plurality of H-configuration power converter phases to be approximately equal to current flowing through each of the remainder of the plurality of H-configuration power converter phases that are enabled.

The method may also include sensing current flow through an inductor. Optionally, the method further includes switching a plurality of active switches arranged in an H-configuration such that current is directed through the inductor by an operation of the active switches. The method may further include controlling a duty cycle of a plurality of active switches arranged in an H-configuration using respective pulse width modulators. When disabling at least one of the plurality of H-configuration power converter phases, the method may also include disabling the respective pulse width modulators associated with the disabled phase.

An embodiment of a vehicle system is also disclosed. The vehicle system includes a first electrical system operating at a first voltage level and configured to provide electrical power to a first device, a second electrical system operating at a second voltage level and configured to provide electrical power to a second device, and a multi-phase bi-directional DC/DC power converter configured to receive the electrical power from one of the first electrical system and the second electrical system and providing electrical power to the other of the first electrical system and the second electrical system. The power converter includes a plurality of single phase DC/DC power converter circuits coupled in electrical parallel between the first electrical system and the second electrical system. The plurality of single phase DC/DC power converter circuits each are configured to receive electrical power from one of the first electrical system and the second electrical system and provide electrical power to the other of the first electrical system and the second electrical system. A converter controller is configured to control an operation of the plurality of single phase DC/DC power converter circuits and disable one of the plurality of single phase DC/DC power converter circuits to increase an efficiency of the multi-phase bi-directional DC/DC power converter.

The single phase DC/DC power converter circuits optionally includes an H-configuration power switching section wherein a first leg of the H-configuration power switching section is coupled between a first electrical bus operating at a first voltage level and a circuit return and a second leg of the H-configuration power switching section coupled between a second electrical bus operating at a second voltage level and the circuit return. The converter controller may be configured to control a switching of a plurality of switches between an off condition wherein the switch is an electrical open and an on condition wherein the switch is an electrical short, the plurality of switches coupled together in a respective H-configuration between the first electrical bus and the second electrical bus. The converter controller may also be configured to maintain the plurality of switches in an off condition when a respective one of the single phase DC/DC power converter circuits is disabled. Optionally, the respective H-configuration comprises an inductor wherein a current through the inductor is controlled by respective positions of the plurality of switches and the converter controller may be configured to maintain approximately zero electrical current flow through the inductor when a respective one of the single phase DC/DC power converter circuits is disabled.

The converter controller may include a plurality of pulse width modulators communicatively coupled to respective ones of the plurality of switches wherein the pulse width modulators are configured to control respective positions of the plurality of switches and to maintain the plurality of switches in an off condition when a respective one of the single phase DC/DC power converter circuits is disabled. In another optional embodiment, the converter controller is further configured to operate the first and second single phase DC/DC power converter circuits in a first buck mode when the first electrical bus voltage is greater than second electrical bus voltage and to operate the first and second single phase DC/DC power converter circuits in a second boost mode when the first electrical bus voltage is less than second electrical bus voltage.

An embodiment of a multi-phase bi-directional DC/DC power converter has been disclosed. The power converter includes a plurality of single phase DC/DC power converter circuits coupled in electrical parallel. Each of the plurality of single phase DC/DC power converter circuits is configured to receive electrical power from a first electrical bus operating at a first voltage level and to provide electrical power to a second electrical bus operating at a second voltage level. Each of the plurality of single phase DC/DC power converter circuits is further configured to receive electrical power from the electrical bus operating at the second voltage level and to provide electrical power to the first electrical bus operating at the first voltage level.

The power converter also includes a converter controller including a compensator configured to generate a control signal based on a current command signal and an actual current signal, and a saturation limit function module configured to determine a saturation limit for the compensator while compensator is in the disabled state.

The converter controller is configured to control an operation of the plurality of single phase DC/DC power converter circuits independently of each other and disable one or more of the plurality of single phase DC/DC power converter circuits to increase an efficiency of the multi-phase bi-directional DC/DC power converter. The converter controller is further configured to match the saturation limit values of the compensator to current operating values when one or more of the plurality of single phase DC/DC power converter circuits is disabled and re-enable the one or more of the plurality of single phase DC/DC power converter circuits using the matched saturation limit values such that current through the one or more of the plurality of single phase DC/DC power converter circuits is limited to control a transient current stress.

Optionally, the saturation limit function module is configured to determine saturation limits using:

$$SatLim(V1,V2)=V2/(2*V1), \text{ when } V2<V1, \text{ and}$$

$$SatLim(V1,V2)=((V2-V1)/(2*V2))+0.5, \text{ when } V2>V1,$$

where V1 represents the first voltage level and V2 represents the second voltage level.

Moreover, each of the plurality of single phase DC/DC power converter circuits optionally includes an H-configuration power switching section. A first leg of the H-configuration power switching section is coupled between the first electrical bus operating at the first voltage level and a circuit return. A second leg of the H-configuration power switching section is coupled between the second electrical bus operating at the second voltage level and the circuit return.

The converter controller is also optionally configured to control a switching of a plurality of switches between an off condition wherein the switch is an electrical open and an on condition wherein the switch is an electrical short. The plurality of switches are coupled together in a respective H-configuration between the first electrical bus and the second electrical bus. The converter controller is also optionally configured to maintain the plurality of switches in an off condition when a respective one of the plurality of single phase DC/DC power converter circuits is disabled.

Optionally, each respective H-configuration includes an inductor wherein a current through the inductor is controlled by respective positions of the plurality of switches. The converter controller is configured to maintain approximately zero electrical current flow through the inductor when a respective one of the single phase DC/DC power converter circuits is disabled.

The converter controller optionally includes a plurality of pulse width modulators communicatively coupled with respective ones of the plurality of switches. The pulse width modulators are configured to control respective positions of the plurality of switches and are configured to maintain the plurality of switches in an off condition when a respective one of the single phase DC/DC power converter circuits is disabled.

Optionally, the converter controller is further configured to operate the plurality of single phase DC/DC power converter circuits in a first buck mode when the first electrical bus voltage is greater than second electrical bus voltage and to operate the plurality of single phase DC/DC power converter circuits in a second boost mode when the first electrical bus voltage is less than second electrical bus voltage.

A method of supplying electrical power between a first electrical bus operating at a first nominal voltage level and a second electrical bus operating at a second nominal voltage level using a multi-phase bi-directional DC/DC power converter is disclosed. The method includes coupling a plurality of H-configuration power converter phases together in electrical parallel, controlling current flowing through each of the plurality of H-configuration power converter phases to be approximately equal to current flowing through each other of the plurality of H-configuration power converter phases, disabling at least one of the plurality of H-configuration power converter phases, and maintaining a remainder of the plurality of H-configuration power converter phases enabled. The method further includes controlling current flowing through the remainder of the plurality of H-configuration power converter phases to be approximately equal to current flowing through each other of the remainder of the plurality of H-configuration power converter phases that are enabled, determining saturation limits based on the first nominal voltage level and the second nominal voltage levels, matching saturation limit values for a saturation limiter of a current compensator to present operating values when at least one of the plurality of H-configuration power converter phases is disabled, and re-enabling the at least one of the plurality of H-configuration power converter phases using the matched saturation limit values such that current through the at least one of the plurality of H-configuration power converter phases is limited to control a transient current stress.

Optionally, the method includes sensing a current flow through an inductor and switching a plurality of active switches arranged in an H-configuration such that current is directed through the inductor by an operation of the active switches. The method also optionally includes controlling a duty cycle of a plurality of active switches arranged in an H-configuration using a respective pulse width modulator and disabling the respective pulse width modulators associated with the disabled phase.

A vehicle system is disclosed. The vehicle system includes a first electrical system operating at a first voltage level and configured to provide electrical power to a first device, a second electrical system operating at a second voltage level and configured to provide electrical power to a second device, and a multi-phase bi-directional DC/DC power converter configured to receive the electrical power from one of the first electrical system and the second electrical system and providing electrical power to the other of the first electrical system and the second electrical system. The multi-phase bi-directional DC/DC power converter including a plurality of single phase bi-directional DC/DC power converter circuits coupled in electrical parallel between the first electrical system and the second electrical system, the plurality of single phase DC/DC power converter circuits each configured to receive electrical power from one of the first electrical system and the second electrical system and provide electrical power to the other of the first electrical system and the second electrical system. The multi-phase bi-directional DC/DC power converter further including a converter controller including a compensator configured to generate a control signal based on a current command signal and an actual current signal. The converter controller is configured to control an operation of the plurality of single phase bi-directional DC/DC power converter circuits independently of each other and disable at least one of the plurality of single phase bi-directional DC/DC power converter circuits to increase an efficiency of the multi-phase bi-directional DC/DC power converter. The converter controller is also configured to determine saturation limits values for the compensator based on the first nominal voltage level and the second nominal voltage levels and match the saturation limit values to current operating values when one or more of the plurality of single phase bi-directional DC/DC power converter circuits is disabled. The converter controller is further configured to re-enable the one or more of the plurality of single phase bi-directional DC/DC power converter circuits using the matched saturation limit values such that current through the one or more of the plurality of single phase DC/DC power converter circuits is limited to control a transient current stress.

Optionally, the converter controller includes a saturation limit function module configured to determine saturation limits using:

$$\text{SatLim}(V1,V2)=V2/(2*V1), \text{ when } V2<V1, \text{ and}$$

$$\text{SatLim}(V1,V2)=((V2-V1)/(2*V2))+0.5, \text{ when } V2>V1,$$
where

V1 represents the first voltage level and V2 represents the second voltage level.

The converter controller is also optionally configured to control a switching of a plurality of switches between an off condition wherein the switch is an electrical open and an on condition wherein the switch is an electrical short, the plurality of switches coupled together in a respective H-configuration between the first electrical bus and the second electrical bus. The converter controller is also optionally configured to maintain the plurality of switches in an off condition when a respective one of the single phase DC/DC power converter circuits is disabled. Optionally, the respective H-configuration includes an inductor wherein a current through the inductor is controlled by respective positions of the plurality of switches. The converter controller is configured to maintain approximately zero electrical current flow through the inductor when a respective one of the single phase DC/DC power converter circuits is disabled.

The converter controller also optionally includes a plurality of pulse width modulators communicatively coupled to respective ones of the plurality of switches. The pulse width modulators are configured to control respective positions of the plurality of switches and to maintain the plurality of switches in an off condition when a respective one of the single phase DC/DC power converter circuits is disabled. The converter controller is further optionally configured to operate the first and second single phase DC/DC power converter circuits in a first buck mode when the first electrical bus voltage is greater than second electrical bus voltage and operate the first and second single phase DC/DC power converter circuits in a second boost mode when the first electrical bus voltage is less than second electrical bus voltage.

This written description uses examples to describe the disclosure, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A multi-phase bi-directional DC/DC power converter comprising:
a plurality of single phase DC/DC power converter circuits coupled in electrical parallel, each of the plurality of single phase DC/DC power converter circuits configured to receive electrical power from a first electrical bus operating at a first voltage level and to provide electrical power to a second electrical bus operating at a second voltage level, each of the plurality of single phase DC/DC power converter circuits configured to receive electrical power from said electrical bus operating at the second voltage level and to provide electrical power to the first electrical bus operating at the first voltage level; and
a converter controller configured to:
control an operation of said plurality of single phase DC/DC power converter circuits independently of each other;
disable one or more of said plurality of single phase DC/DC power converter circuits to increase an efficiency of said multi-phase bi-directional DC/DC power converter; and
re-enable the one or more of said plurality of single phase DC/DC power converter circuits such that current through the one or more of said plurality of single phase DC/DC power converter circuits is limited to control a transient current stress.

2. The power converter of claim 1, wherein said converter controller comprises a compensator configured to generate a control signal based on a current command signal and an actual current signal.

3. The power converter of claim 2, further comprising a saturation limit function module configured to determine a saturation limit value for said compensator while said one or more of said plurality of single phase DC/DC power converter circuits are disabled.

4. The power converter of claim 2, wherein the converter controller is configured to:
match the saturation limit value of said compensator to a current operating value when said one or more of said plurality of single phase DC/DC power converter circuits is disabled; and
re-enable the one or more of said plurality of single phase DC/DC power converter circuits using the matched saturation limit value such that current through the one or more of said plurality of single phase DC/DC power converter circuits is limited to control the transient current stress.

5. The power converter of claim 3, wherein said saturation limit function module is configured to determine the saturation limit value according to the following relationships:

$$\text{SatLim}(V1,V2)=V2/(2*V1), \text{ when } V2<V1, \text{ and}$$

$$\text{SatLim}(V1,V2)=((V2-V1)/(2*V2))+0.5, \text{ when } V2>V1,$$
and where V1 represents the first voltage level and V2 represents the second voltage level.

6. The power converter of claim 1, wherein each of said plurality of single phase DC/DC power converter circuits comprises an H-configuration power switching section, a first leg of said H-configuration power switching section coupled between said first electrical bus operating at the first voltage level and a circuit return, a second leg of said H-configuration power switching section coupled between said second electrical bus operating at the second voltage level and the circuit return.

7. The power converter of claim 1, wherein said converter controller is configured to control a switching of a plurality of switches between an off condition wherein the switch is an electrical open and an on condition wherein the switch is an electrical short, the plurality of switches coupled together in a respective H-configuration between said first electrical bus and said second electrical bus.

8. The power converter of claim 7, wherein said converter controller is configured to maintain said plurality of switches in an off condition when a respective one of said plurality of single phase DC/DC power converter circuits is disabled.

9. The power converter of claim 7, wherein said respective H-configuration comprises an inductor, a current through said inductor controlled by respective positions of said plurality of switches, said converter controller is configured to maintain approximately zero electrical current flow through said inductor when a respective one of said single phase DC/DC power converter circuits is disabled.

10. The power converter of claim 7, wherein said converter controller comprises a plurality of pulse width modulators communicatively coupled with respective ones of said plurality of switches, said pulse width modulators configured to control respective positions of said plurality of switches, said pulse width modulators configured to maintain said plurality of switches in an off condition when a respective one of said single phase DC/DC power converter circuits is disabled.

11. The power converter of claim 1, wherein said converter controller is further configured to:
operate said plurality of single phase DC/DC power converter circuits in a first buck mode when said first electrical bus voltage is greater than second electrical bus voltage; and
operate said plurality of single phase DC/DC power converter circuits in a second boost mode when said first electrical bus voltage is less than second electrical bus voltage.

12. A method of supplying electrical power between a first electrical bus operating at a first nominal voltage level and a second electrical bus operating at a second nominal voltage level using a multi-phase bi-directional DC/DC power converter said method comprising:
coupling a plurality of H-configuration power converter phases together in electrical parallel;
controlling current flowing through each of the plurality of H-configuration power converter phases to be approximately equal to current flowing through each other of the plurality of H-configuration power converter phases;
disabling at least one of the plurality of H-configuration power converter phases;
maintaining a remainder of the plurality of H-configuration power converter phases enabled;
controlling current flowing through the remainder of the plurality of H-configuration power converter phases to be approximately equal to current flowing through each other of the remainder of the plurality of H-configuration power converter phases that are enabled; and
re-enabling the at least one of the plurality of H-configuration power converter phases using the matched saturation limit values such that current through the at least one of the plurality of H-configuration power converter phases is limited to control a transient current stress.

13. The method of claim 12, further comprising:
determining saturation limits based on the first nominal voltage level and the second nominal voltage levels;
matching saturation limit values for a saturation limiter of a current compensator to present operating values when at least one of the plurality of H-configuration power converter phases is disabled.

14. The method of claim 12, wherein controlling current flowing through each of the plurality of H-configuration power converter phases further comprises sensing current flow through an inductor.

15. The method of claim 14, wherein controlling current flowing through each of the plurality of H-configuration power converter phases further comprises switching a plurality of active switches arranged in an H-configuration such that current is directed through the inductor by an operation of the active switches.

16. The method of claim 14, further comprising controlling a duty cycle of a plurality of active switches arranged in an H-configuration using a respective pulse width modulator.

17. The method of claim 10, wherein disabling at least one of the plurality of H-configuration power converter phases comprises disabling the respective pulse width modulators associated with the disabled phase.

18. A vehicle system comprising
a first electrical system operating at a first voltage level and configured to provide electrical power to a first device;
a second electrical system operating at a second voltage level and configured to provide electrical power to a second device; and
a multi-phase bidirectional DC/DC power converter configured to receive the electrical power from one of the first electrical system and the second electrical system and providing electrical power to the other of the first electrical system and the second electrical system, said multi-phase bidirectional DC/DC power converter comprising:
a plurality of single phase bidirectional DC/DC power converter circuits coupled in electrical parallel between the first electrical system and the second electrical system, said plurality of single phase DC/DC power converter circuits each configured to receive electrical power from one of said first electrical system and said second electrical system and provide electrical power to said other of said first electrical system and said second electrical system; and
a converter controller comprising a compensator configured to generate a control signal based on a current command signal and an actual current signal, said converter controller configured to:
control an operation of said plurality of single phase bidirectional DC/DC power converter circuits independently of each other; and
disable at least one of said plurality of single phase bidirectional DC/DC power converter circuits to increase an efficiency of said multi-phase bi-directional DC/DC power converter;
determine saturation limits values for said compensator based on the first nominal voltage level and the second nominal voltage levels;
match the saturation limit values to current operating values when one or more of said plurality of single phase bidirectional DC/DC power converter circuits is disabled; and
re-enable the one or more of said plurality of single phase bidirectional DC/DC power converter circuits using the matched saturation limit values such that current through the one or more of said plurality of single phase DC/DC power converter circuits is limited to control a transient current stress.

19. The system of claim 18, wherein said converter controller comprises a saturation limit function module configured to determine saturation limits according to the following relationships:

$SatLim(V1,V2)=V2/(2*V1)$, when $V2<V1$, and $SatLim(V1,V2)=((V2-V1)/(2*V2))+0.5$, when $V2>V1$, and where V1 represents the first voltage level and V2 represents the second voltage level.

20. The system of claim 18, wherein said converter controller is configured to control a switching of a plurality of switches between an off condition wherein the switch is an electrical open and an on condition wherein the switch is an electrical short, the plurality of switches coupled together in a respective H-configuration between said first electrical bus and said second electrical bus.

\* \* \* \* \*